United States Patent [19]
Cattaneo et al.

[11] Patent Number: 4,759,940
[45] Date of Patent: Jul. 26, 1988

[54] METHOD OF PRODUCING BARS COMPOSED OF MILK AND SIMPLE AND COMPLEX SUGARS

[75] Inventors: Claudio Cattaneo, Bergamo; Gianni Rho, Lodi, both of Italy

[73] Assignee: Societa' di Esportazione Polenghi Lombardo S.p.A., Lodi, Italy

[21] Appl. No.: 787,655

[22] Filed: Oct. 16, 1985

[30] Foreign Application Priority Data

Jun. 19, 1985 [IT] Italy ................. 21192 A/85

[51] Int. Cl.$^4$ .................. A23C 9/18; A23C 21/08; A23C 21/10
[52] U.S. Cl. ................. 426/588; 426/583; 426/660; 426/454; 426/584; 426/810; 426/74
[58] Field of Search ............... 426/588, 583, 660, 454, 426/584, 590, 810, 74

[56] References Cited

U.S. PATENT DOCUMENTS

| | | | |
|---|---|---|---|
| 1,689,357 | 10/1928 | Merrell | 426/588 |
| 3,241,975 | 3/1966 | Brochner | 426/588 |
| 4,446,164 | 5/1984 | Brog | 426/588 |

FOREIGN PATENT DOCUMENTS

| | | | |
|---|---|---|---|
| 0090775 | 10/1983 | European Pat. Off. | 426/588 |
| 7007949 | 3/1970 | Japan | 426/588 |

*Primary Examiner*—Jeanette Hunter
*Attorney, Agent, or Firm*—Hedman, Gibson, Costigan & Hoare

[57] ABSTRACT

The method consists of intimately dry mixing a set amount of powdered milk with a set amount of ground microcrystalline sugar as binder alone or with one or more carbohydrates selected from a group including glucose, fructose, maltose, sucrose, matoldextrines, and maltitol, and of compressing the mixture into a bar. Fluorine and/or flavoring matter, such as cocoa, coffee, strawberry flavor, mint flavor, are added to the mixture prior to its compression. The resulting bars are in the form of square-based parallelepipeds with rounded corners.

11 Claims, No Drawings

METHOD OF PRODUCING BARS COMPOSED OF MILK AND SIMPLE AND COMPLEX SUGARS

DESCRIPTION

This invention relates to a method of producing bars composed of milk and simple and complex sugars.

The invention also concerns bars obtained by the subject method.

From a nutritional standpoint, the value of milk is well recognized: it represents an excellent diet contributor, especially for the young, elder, and any person in some particular physiological conditions, such as pregnancy or convalescence. In many cases, however, the liquid, relatively unwieldly nature of milk may bar its consumption. Powdered milk is more convenient to carry along thanks to its lighter weight, and is more stable if properly stored, but cannot be consumed as such, since it requires to be re-dissolved in water, which involves the availability of a supply of potable water. One viable approach to the problem of promoting a higher consumption of milk is that of providing it in a solid form, so that it can be made more compact and easy to carry along, requires no refrigeration, can be preserved over long periods of time without undergoing alterations, and be readily consumed in all circumstances: at job or study sites, on travel, during the practice of sports or while relaxing, without requiring any special preparation. The provision of milk in solid form also enables it to be suitably additivated to meet individual requirements of the occasion or the potential consumer.

French Pat. No. 720,488 of July 18, 1931 discloses a method for obtaining a solid product made of milk, which consists of admixing a sugar syrup with milk, and evaporating the mixture in two stages down to a dry residue of 85-93%. The resulting plastic product is poured, while still hot, into molds wherein it is allowed to cool and solidify. However, the fact that moisture contents down to a level on the order of 2-3% cannot be achieved, is no assurance of the product being preservable.

A method for obtaining bars made of milk cream, for use dissolved in hot drinks, is disclosed in U.S. Pat. No. 3,241,975 of Dec. 5, 1962 and in the corresponding Federal Republic of Germany Pat. No. 1,301,230 of Dec. 4, 1963. That method consists of admixing with a fluid milk cream at 20% fat by weight, 3.3-4.2% by weight, referred to the total solid content of the milk cream, of phosphates and/or citrates of sodium and/or potassium, and 10-24% by weight, referred to the total solid content of the mixture, of lactose. The mixture is pasteurized, homogenized, concentrated by evaporation, and dried to yield a powder having a moisture content in the 0.5% to 5.0% range by weight. The intermediate powder is admixed with an additional amount of lactose in the dry state, moistened by the addition of 2-20% by weight water, granulated, and then compressed to produce a bar which, before packaging, is dried to bring its water content down to 2% by weight or less. The end product is readily soluble in hot liquids, but is not intended for direct consumption on account of its being a hyperlipidic and hypoproteic product, which characteristic is contrary to modern feeding science.

British Pat. No. 1,204,445 of Mar. 28, 1968 discloses a method of preparing bars from powdered milk (90% by weight referred to the bar), sucrose (8.5-9.0% by weight), starch (1% by weight), and any savoring and flavoring substances (0.5% by weight). This is a product containing disaccharides (lactose and sucrose), and wherein the small amount of a polysaccharide (starch) is intended to function as a binder favoring tablet-making.

Italian Pat. No. 1,061,502 of June 5, 1981 discloses a method for obtaining bars made of partially skimmed milk skim milk and mono- and disaccharides, wherein the binding effect is provided by the very sugars which are added at two discrete stages of the process. The liquid partially skimmed milk is addivitated with a solution containing a syrup of glucose, maltose, and sucrose. The amount of the sucrose added at this stage varies in the range of 30% to 70% by weight of the total amount of the sugars added. The milksugar solution blend, following pasteurization and homogenization, is concentrated by concentrated by evaporation and then dried to yield an intermediate powder. After dry blending, the powder is compressed to provide bars which do not crumble naturally on packaging but remain crisp under one's teeth. The production technology is made complicated by that flowing milk is used, which is an unwieldy and not easily preserved material.

It is the object of this invention to provide a method of producing bars made of milk and simple and complex sugars of various nature and in varying proportions to one another, to thereby yield a hypolipidic, hyperproteic, and energetic product which can meet the nutritional requirements of a broad range of potential consumers in need of a proteic and energetic contribution when confronted with particular bodily or physiological situations.

This object is achieved, according to the invention, by a method characterized in that it comprises the steps of intimately mixing together in the dry state a set amount of powdered milk with a set amount of sugars, and compressing the dry mixture to yield a solid bar.

In the ensuing description, the term "powdered milk" refers to the product obtained by removing nearly all the water from liquid milk, the term "powdered whey" refers to the product obtained by removing nearly all the water from whey which is left over from the separation of the coagulate (rennet-making) in the manufacture of cheese, and the terms "sugars" and "simple" and "complex" sugars refer to mono-, di-, and polysaccharides with different chemical characters the term carbohydrates is used to indicate generally the combination of mono-, di-, and poly-saccharides.

More specifically, this invention is concerned with a method for producing a bar of milk and simple and complex sugars, which may be regarded, from the nutritional standpoint, as the antithesis to the traditional hard candy of sugars, colors, and flavoring agents. The purely hedonistic use which is made of the hard candy has obliterated the notion that it actually is a mainly, if not exclusively, energetic food item owing to the contribution of simple sugars. The excessive use which is often made of such products, and especially so during boyhood, contributes heavily to the unbalance of the nutrients present in the diet, and is at the origin of some typical affections such as obesity, diabetes, dental decay, etc. Also, the fact that the sugars present in the hard candy are simple sugars which are quickly assimilated worsen the picture.

The bars to be obtained in accordance with this invention have instead a proper nutritional function by virtue of their supplying readily assimilable proteins of high biological value, calcium, which is essential to the young and elder, and on account of the favorable balance of potassium and sodium as befitting hypertensed subjects, of the contribution in lactose, which plays a favorable role in the assimilation of calcium and iron, and of the presence of complex sugars, which in a proper diet should represent 75% of the carbohydrates taken in. All this in the form of a crisp hard candy with an appealing natural taste.

The bars to be obtained with the method of this invention may also have an important dietetic function through an appropriate selection of sugars having a low caloric contribution level and/or a decay-fighting function, e.g. by the addition of fluorine salts.

The method of ths invention will be further illustrated through the following Examples, given herein by way of illustration and not of limitation.

EXAMPLE 1

144 kg partially skimmed milk is provided in powdered form, and 42.7 kg microcrystalline glucose, 3.3 kg crystallized malt extract and 10 kg sucrose are added. The mixture is blended dry at room temperature in a standard powder blender. Blending is carried on for 15 minutes. Thereafter, 21 kg sucrose and 0.5 kg ascorbic acid are added as finely ground in a special mill to reduce the particulate size to about 300 mesh. Dry blending is resumed and carried on for an additional 15 minutes. The resulting powder is then compressed in a tablet-making apparatus operated at a pressure of 4000 kg/cm$^2$. Bars with square bases and rounded corners are obtained which measure 18 mm along one side and are 6 mm high, their weight being 2.7 grams. The bars have a very pale yellow color, are crumbly on chewing, and taste like sweetened milk. Sample bars subjected to a crushing test on an INSTRON UNIVERSAL TESTING MACHINE dynamometer having a $\frac{1}{4}''$ diameter bit moving down at the rate of 10 cm/min have shown an ultimate crushing strength in the range of 1500 to 1650 grams. The percent composition of the bars was the following: 19.9% proteins, 6.9% fats, 65.9% carbohydrates, 5.0% ashes, 2% moisture, all the percentages being by weight.

EXAMPLE 2

144 kg partially skimmed milk is provided in powdered form. 42.7 kg microcrystalline glucose, 3.3 kg crystallized malt extract, 31 kg sucrose, and 0.5 kg ascorbic acid are mixed together separately. The sugar mixture is then subjected to fine blending in a special mill until the particulate size is reduced to about 300 mesh. The sugar mixture thus processed is blended dry in a standard blender for powders with the above amount of powdered partially skimmed milk. Blending is carried on for 25 minutes. The resulting dry blend is compressed on a similar apparatus as in Example 1, to yield bars having the same shape, size and weight. The bars are crumbly on chewing, and when tested for crushing strength on the same dynamometer as in Example 1 exhibit a crushing strength in the 1750 to 1900 grams range. The percent composition is unchanged from the bars obtained in Example 1.

EXAMPLE 3

144 kg partially skimmed milk is provided in powdered form, and 65 kg microcrystalline glucose, 9.5 kg crystallized malt extract, and 30 kg sucrose are added thereto. The mixture is blended dry at room temperature using a standard powder blending. Blending is continued for 15 minutes. Thereafter, 40 kg sucrose and 0.5 kg ascorbic acid finely ground in a special mill until the particulate size is reduced to about 300 mesh are added. Dry blending is resumed and carried on for another 15 minutes. The resulting powder is compressed on a tablet-maker in the same conditions as in the previous Examples. The bars obtained thereby have the same shape, size, and weight as in the previous Examples. The bars have a very pale yellow color and a pleasant taste of sweetened milk. Sample bars subjected to crushing test on the INSTRON dynamometer show a crushing strength in the 1700 to 1800 g range. The percent composition of the bars is as follows: 15.3% proteins; 5.3% fats; 73.8% carbohydrates; 3.6% ashes; 1.6% moisture; all the percentages being by weight.

EXAMPLE 4

144 kg partially skimmed milk is provided in powdered form, to which are added 25 kg microcrystalline glucose and 30 kg maltodextrines. Dry blending is carried out with the same procedure as in the previous Examples, over a period of 15 minutes. 30 kg sucrose, 60 kg maltodextrines, and 0.6 kg ascorbic acid are provided. The mixture is ground in a special mill down to a particulate size of about 300 mesh, and the ground mixture is then added to the previously prepared mixture and blended therewith for 20 minutes in a standard powder blender. The end blend is compressed in the same conditions as the previous Examples to yield similar bars. The bars are crisp on chewing and have a pleasant taste of malt milk. When tested for crushing strength on the INSTRON dynamometer, they show a crushing strength in the 1650 to 1900 g range. The percent composition is similar to that of the bars obtained in Example 3, except that the carbohydrates account for 73.3% and moisture 2.1% by weight.

From the point of view of nutrition power, in this case, about 40% of the energy supplied by the sugars comes from polysaccharides, thereby it is not available at once: the energetic effect due to taking a bar of this type is better distributed over time.

EXAMPLE 5

The same procedure as in Example 3 is followed, with the sole difference that, instead of 65 kg microcrystalline glucose, 30 kg glucose and 35 kg fructose are used. The latter is dry ground simultaneously with the 40 kg sucrose and 0.6 kg ascorbic acid. Bars similar to those obtained in Example 3 are yielded, but having a "fresher" sweet taste due to the presence of fructose.

EXAMPLE 6

90 kg partially skimmed milk in powder form and 55 kg dairy whey in powder form are provided; to this are added 32 kg microcrystalline glucose, 3.0 kg crystallized malt extract, and 20 kg sucrose. The mixture is blended dry with the same procedure as in the previous Examples. 40 kg sucrose and 0.5 kg ascorbic acid as finely ground to reduce the particulate size down to about 300 mesh are added. Dry blending is resumed and carried on for 15 minutes. The resulting powder is compressed in the same conditions as in the previous Examples to yield bars. The bars are like those of the previous Examples, being characterized by a very pale yellow color and in that they are crisp on chewing and have a stronger taste. Testing on the INSTRON dynamometer shows for the various samples tested a crushing strength in the range of 1700 to 1850 grams. The percent composition is as follows: 15.0% proteins, 5.6% fats, 72.2% carbohydrates, 5.1% ashes, 1.8% moisture, all the percentages shown being by weight.

From the nutritional standpoint, these bars have the advantage of having a whey protein-to-casein ratio of about 0.4, whereas in conventional powdered milk this ratio is of about 0.15. This higher ratio bring about, as is known, an increased biological value of the proteic fraction.

EXAMPLE 7

75 kg partially skimmed milk in powder form is provided, to which are added 30 kg microcrystalline glucose and 20 kg sucrose. The mixture is blended dry with the same procedure as described in the previous Examples. 60 kg sucrose, 30 kg fructose, 180 kg maltodextrine, 2.0 kg ascorbic acid, and 70 kg whey proteins in powder form having a high protein content (during the test of this Example: 68.1% by weight) and as obtained, for example, by ultrafiltration and ultrafiltration-diafiltration, are provided. The latter mixture of ingredients is finely ground in a special mill until the particulate size is reduced to about 300 mesh, and is then added to the former mixture, dry blending being carried on for 20 minutes. The end powder resulting from the blending process is compressed with the same procedure as in the previous Examples. Bars are yielded which have similar shapes, dimensions, and weights as those described in the previous Examples, characterized in that they taste malt and are crisp on chewing. The crushing strength, as measured on the INSTRON dynamometer, is 1700–1950 grams. The percent composition of the bars is as follows: 15.1% proteins, 3.5% fats, 77.3% carbohydrates, 1.7% ashes, 2.1% moisture, with the percentages being by weight.

These bars are quite interesting from the nutritional standpoint in that the whey proteins/casein ratio is on the order of 2.4, which imparts a high biological value to the proteic fraction on account of the balancing of the essential amino acids. They contain sugars of various nature (lactose, fructose, maltose, and sucrose), slightly less than 50% of the energy provided by the sugars comes from polysaccharides, and they contain little fat. All these features update the bars with modern theories of food science.

EXAMPLE 8

The same procedure as in Example 3 is followed, with the sole difference that, during the first blending step, 1.5 kg cocoa powder is added to the partially skimmed milk and sugars. The bars, following compression of the end blend, have a light brown color, are crisp on chewing, and taste pleasantly of cocoa milk. The crushing strength, as measured on the INSTRON dynamometer, is in the range of 1500 to 1650 grams. The percent composition of the bars is little different from that specified in Example 3, namely: 15.3% proteins, 5.4% fats, 73.6% carbohydrates, 3.8% ashes, with the percentages being by weight.

EXAMPLE 9

The procedure explained in Example 3 is repeated again, with the sole difference that 0.15 kg freeze dried coffee is added to the 40 kg sucrose prior to grinding. The bars yielded have a dull whitish color and taste pleasantly of milk and coffee. Neither the crushing strength nor the percent composition are significantly altered by the addition of freeze dried coffee.

EXAMPLE 10

The same procedure as in Example 3 is followed, with the sole difference that during the final ingredient blending step, 0.05 kg strawberry flavor in powder form is finely sprinkled thereover. Compression of the blend results in bars having similar physical and chemical characteristics to those described in Example 3, excepting that the bars have now a pleasant scent of strawberry which marries well to that of milk.

EXAMPLE 11

The test of Example 10 is repeated with the difference that the strawberry flavor is now replaced with 0.06 kg mint flavor. The bars, which are similar to the previously discussed ones, have a mint flavor which overlaps pleasantly that of milk.

EXAMPLE 12

The same procedure as described in Example 3 is followed, with the only difference that the 40 kg sucrose are additivated, prior to grinding, with 0.03 kilograms sodium fluoride.

After final blending, compression of the powder has led to obtaining bars with similar physical and chemical characteristics to those described in Example 3, but with a fluorine content which is adequate to develop a protective action against decay.

The Examples of the method according to this invention given hereinabove by way of illustration and not of limitation show that bars may be obtained with even different shapes, sizes, and weights from those specified, wherein powdered milk, whether skim or partially-skimmed milk, or whole, is additivated with simple and complex sugars to yield an alternative product to typical hard candies which constitutes a balanced nourishment from the standpoint of its nutrients. The sugars which are added to the powdered milk typically represent 20% to 400% by weight of the powder milk and comprise mono-, di-, and polysaccharides. Some of the sugars added may be finely ground before adding to impart the bar with firmness and crispness. A proportion of the powdered milk, ranging from 5% to 60%, comprise dairy whey in powder form either as such or to a greater or lesser extent delactosed and/or demineralized by ultrafiltration or some other techniques leading to like results. The blended powder for compression may be additivated with substances effective to impart specific flavors and/or savors to the bars, as selected from cocoa, coffee, strawberry flavor, mint flavor, or flavors of other fruits or aromatic herbs.

I claim:

1. A method of producing a solid tablet containing milk or whey or a combination thereof and sugar, consisting essentially of:

(a) dry mixing powdered milk or whey or a combination thereof containing essentially no added sugar with ground microcrystalline sugar alone or in combination with non-microcrystalline sugar in the absence of a binder other than said ground sugar in a weight ratio of said ground sugar to said powdered material of 100:20–400, wherein 10 to 100 percent of the sugar present in said dried mixture is said ground microcrystalline sugar; and (b) compressing the dry mixture under sufficient pressure to thereby form the solid tablet.

2. The method of claim 1 comprising adding and mixing said ground microcrystalline sugar or said non-microcrystalline sugar with the milk or whey or combination thereof to form a first mixture, and then adding and mixing the other of said non-microcrystalline sugar or said ground microcrystalline sugar with said first mixture to form a second mixture.

3. The method of claim 1 wherein the microcrystalline sugar has a particle size of about 300 mesh.

4. The method of claim 3 wherein the milk powder is obtained from whole milk, skimmed milk or partially skimmed milk.

5. The method of claim 1, wherein the sugars are selected from the group consisting of monosaccharides, mono- and di-saccharides, and mono-, di- and polysaccharides.

6. The method of claim 5 wherein the sugars are selected from the group consisting of glucose, fructose, saccharose, maltodextrines, maltitol and mixtures thereof.

7. The method of claim 1 wherein the solid tablet is not readily soluble in water.

8. The method of claim 1, wherein the tablet contains powdered milk and powdered whey or powdered whey free from minerals and lactose.

9. The method of claim 1 further including the step of adding flavoring or aromatising compounds to the dry mixture.

10. The method of claim 9 wherein the flavoring or aromatising compounds are selected from cocoa, freeze-dried coffee powder, strawberry flavoring, mint flavoring and coffee flavoring.

11. The method of claim 1 further including the step of adding a fluoride salt to the dry mixture.

* * * * *